(12) United States Patent
Chan et al.

(10) Patent No.: US 7,392,335 B2
(45) Date of Patent: Jun. 24, 2008

(54) ANTICIPATORY CHANGES TO RESOURCES MANAGED BY LOCKS

(75) Inventors: Wilson Wai Shun Chan, San Mateo, CA (US); Angelo Pruscino, Los Altos, CA (US); Michael Zoll, Redwood City, CA (US); Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 115 days.

(21) Appl. No.: 11/351,675

(22) Filed: Feb. 10, 2006

(65) Prior Publication Data

US 2007/0192524 A1  Aug. 16, 2007

(51) Int. Cl.
*G06F 12/14* (2006.01)
(52) U.S. Cl. .......................... 710/200; 710/240; 711/150
(58) Field of Classification Search ................. 710/200, 710/240–244; 711/150
See application file for complete search history.

(56) References Cited

U.S. PATENT DOCUMENTS

| | | | | |
|---|---|---|---|---|
| 5,893,157 | A * | 4/1999 | Greenspan et al. | 711/150 |
| 5,895,494 | A * | 4/1999 | Scalzi et al. | 711/150 |
| 6,795,901 | B1 * | 9/2004 | Florek et al. | 711/152 |
| 2003/0145146 | A1 * | 7/2003 | Posner et al. | 710/200 |
| 2006/0136376 | A1 * | 6/2006 | Jain et al. | 707/3 |

OTHER PUBLICATIONS

Molesky, Lory D., et al., "Database Locking Protocols for Large-Scale Cache-Coherent Shared Memory Multiprocessors: Design, Implementation and Performance", University of Massachusetts, Department of Computer Science, written Jun. 6, 1995, 24 pages.

Molesky, Lory D., et al., "Efficient Locking for Shared Memory Database Systems", University of Massachusetts, Department of Computer Science, Lederle Graduate Research Center, partially supported by the National Science Foundation under grant IRI-9109210, written Mar. 1994, 28 pages.

Martinez, Jose F., et al., "Speculative Synchronization: Programmability and Performance for Parallel Codes", XP-011105630, IEEE Computer Society, dated Nov.-Dec. 2003, pp. 126-134.

* cited by examiner

*Primary Examiner*—Mark Rinehart
*Assistant Examiner*—Kim T. Huynh
(74) *Attorney, Agent, or Firm*—Hickman Palermo Truong & Becker LLP; Brian D. Hickman

(57) ABSTRACT

A method and system are provided for performing anticipatory changes to a resource governed by a locking mechanism. Entities (such as transactions in a database system) that want to modify a resource request permission to modify the resource. However, prior to receiving permission, they make anticipatory changes to a private version of the resource. The entities are prevented from making the anticipatory changes permanent until they receive permission to make the changes. Because they can make the changes, and proceed to other operations, before receiving permission, any delay in receiving permission has less adverse effect on their performance.

17 Claims, 4 Drawing Sheets

ANTICIPATORY CHANGES TO RESOURCES MANAGED BY LOCKS

FIELD OF THE INVENTION

The present invention relates to mechanisms for controlling access to resources within a computer system.

BACKGROUND

Computers use resources, such as memory, modems and printers, during the execution of computer programs. Many of these resources are only used periodically by any given computer program. For example, the amount of time a word processing application requires a printer to print documents is typically small relative to the amount of time that the word processing application is used to create documents. If the only process that had access to the printer was a single word processing application, the printer would remain idle most of the time.

To take full advantage of resources, computer networks have been developed in which processes running on many computer devices, or "nodes", can share resources. Thus, instead of having to purchase one printer for every computer, users may purchase a single printer that may be connected to a network that has many computers. Processes on each computer on the network access the printer only when the processes require the printer.

Even though resources may be shared, as described above, many resources may not be used by more than one process at any given time. For example, most printers are unable to print more than one document at a time. Other resources, such as data blocks of a storage medium or tables stored on a storage medium, may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to the resource. There are many types of locks. Some types of locks may be shared by many processes, while other types of locks prevent any other locks to be granted on the same resource.

For example, ownership of a NULL mode lock on a table grants a process no permission to access the table in any manner. Ownership of a concurrent read lock grants a process permission to read the table, but does not guarantee that other processes are not concurrently writing to the table. Ownership of a protected read lock grants a process permission to read the table and guarantees that no other process is concurrently writing to the table. Ownership of a concurrent write lock grants a process permission to write to the table, but does not guarantee that another process is not also writing to the table. Ownership of a protected write lock grants a process permission to write to the table and guarantees that another process is not also writing to the table. Ownership of an exclusive mode lock grants a process permission to do anything with a table, and guarantees that no other process is performing any operation on the table.

Due to the various permissions and guarantees associated with these locks, certain lock combinations are not allowed. For example, if a process owns an exclusive mode lock on a resource, then no other process can be granted any lock other than a NULL mode lock. If a process owns a protected write lock, then no other process may be granted an exclusive mode lock, a protected write lock, a protected read lock or a concurrent write lock. If a process owns a protected read lock, then no other process may be granted an exclusive mode lock, a protected write lock or a concurrent write lock. If a process owns a concurrent write lock, then no other process may be granted an exclusive mode lock, a protected write lock, or a protected read lock. If a process owns a concurrent read lock, then no other process may be granted an exclusive mode lock.

A category of lock that may be held by more than one process at a time is referred to as a share lock. For example, two processes can hold concurrent read locks on the same resource at the same time, so concurrent read locks are share locks. For the purposes of explanation, the following description shall refer to exclusive mode locks, share locks, and NULL mode locks.

Before a process can perform an operation on a resource, the process is required to obtain a lock that grants to the process the right to perform the desired operation on the resource. To obtain a lock, a process transmits a request for the lock to a lock manager. A lock manager is a process that is responsible for granting, queuing, and keeping track of locks on one or more resources. To manage the use of resources in a network system, lock managers are executed on one or more nodes in the network.

According to one prior art implementation, a lock manager implements two types of objects: a resource object and a lock. Resource objects are data structures that correspond to actual resources. An application that uses a lock manager establishes a mapping between actual resources and resource objects. Each resource object has two queues: a granted queue and a convert queue. The granted queue is an unordered list of locks that have been granted. The convert queue is a partially ordered list of locks that have been requested, but not yet granted. Typically, a request for a lock is actually a convert request, where a process holding a lock is requesting that the lock it holds be converted from one mode of lock to a different mode of lock.

Locks are data structures that identify a process and a lock mode. Lock managers attach locks to the grant queues of resource objects to indicate that the process identified in the lock has been granted a lock of the type indicated in the lock on the resource that corresponds to the resource object to which the lock is attached.

FIG. 1 is a block diagram illustrating a typical lock manager 106. Lock manager 106 is a process that is configured to manage a resource object 100 stored in a memory 108. The resource object includes a granted queue 102 and a convert queue 104. Lock manager 106 has attached three locks 110, 112 and 114 to the granted queue 102, and one convert request 130 to the convert queue 104.

All locks and convert requests have a process ID portion and a lock mode portion. The process ID portion 116 of lock 110 indicates that a process PROC_1 owns lock 110, and the lock mode portion 118 of lock 10 indicates that lock 110 is an exclusive lock. The process ID portion 120 of lock 112 indicates that lock 12 is owned by a process PROC_2, and the lock mode portion 122 of lock 112 indicates that lock 112 is a NULL mode lock. The process ID portion 124 of lock 114 indicates that lock 114 is owned by a process PROC_3, and the lock mode portion 126 of lock 114 indicates that lock 114 is a NULL lock. The process ID portion 132 of convert request 130 indicates that convert request 130 is associated with process PROC_4, and the lock mode portion 136 of convert request 130 indicates that PROC_4 currently holds a NULL mode lock on the resource. In addition to a lock mode portion 136, convert request 130 has a requested mode portion 134 that indicates that PROC_4 is requesting an exclusive mode lock.

Lock manager 106 has attached locks 110, 112 and 114 to granted queue 102, indicating that PROC_1 currently has exclusive ownership of the resource that corresponds to resource object 100. Lock manager 106 has attached convert request 130 to the convert queue 104, indicating that PROC_4 has requested but has not yet been granted an exclusive mode lock on the resource associated with resource object 100.

Information pertaining to any given resource may be stored in the resource object that corresponds to the resource. Each resource object is stored in the memory of a single node. The node on which a resource object is stored is referred to as the master node for the resource object.

According to one lock management approach, a process initially establishes a NULL mode lock on all resources that the process will possibly use. Then, when the process actually requires access to a resource, the process requests that its NULL mode lock be converted to a lock that grants to the process the rights to perform the desired operation.

For example, to delete a table, a process must obtain an exclusive mode lock on the resource object that corresponds to the table. To obtain the exclusive mode lock, the process transmits a message to the lock manager that controls the resource object that corresponds to the table. In the message, the process requests that its current NULL mode lock be converted to an exclusive mode lock. If no other process has requested a conversion, and if no currently granted locks would prevent the grant of an exclusive mode lock, then the current lock held by the requesting process is converted to an exclusive mode lock. Once the lock manager performs the requested conversion, the lock manager transmits a message to the requesting process to indicate that the requested conversion operation has been performed.

If a process requires access to read data from a table, the process must obtain a share lock. To obtain a share lock, the process requests the lock manager that controls the resource object that corresponds to the table to convert its current lock to a share lock. If no other process has requested a conversion, and if no currently granted locks would prevent the grant of a share lock, then the current lock held by the requesting process is converted to a share lock.

If an exclusive mode lock has already been granted for the table, then a share lock cannot be granted. Under these circumstances, the lock convert request is placed on the convert queue of the resource object. When the blocking process is ready to release its exclusive lock, the blocking process may send a lock downgrade request to the lock manager. The lock manager responds by converting the exclusive mode lock to a lesser lock that allows the grant of the share lock. The share lock is then granted by moving the share lock request from the requested queue to the granted queue and transmitting a message to the requesting process to inform the requesting process that the share lock has been granted.

The convert queue of a resource object is a partially ordered list that holds all outstanding (ungranted) lock requests. If any outstanding lock requests have not been granted, one of the ungranted lock requests will be at the "head" of the convert queue. Even if the currently granted locks do not prevent a lock manager from granting a particular lock request, the lock request is placed on the convert queue if the convert queue is not empty. This policy prevents "livelocks", where one process cannot make progress in the system while other processes can.

It is not uncommon for many processes to concurrently hold share locks on a resource. The set of processes that hold share locks on a particular resource are collectively referred to herein as the "share lock holders".

If one of the share lock holders (the "requester") wants to convert to an exclusive mode lock, the requester has to first send a convert request to the master node of the resource. When the shared-to-exclusive request reaches the head of the convert queue in the master node of the resource, the master node sends downconvert request messages to all share lock holders asking them to downconvert or close their locks. The master node can only grant the exclusive lock to the requester after all share lock holders acknowledge to the master that they have downconverted their locks. Between the time the requester sends the upgrade request and the time that the exclusive lock is granted, the requester has to wait, and cannot start updating the resource or perform any subsequent work even though the requester already has a current copy of the resource in its cache.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
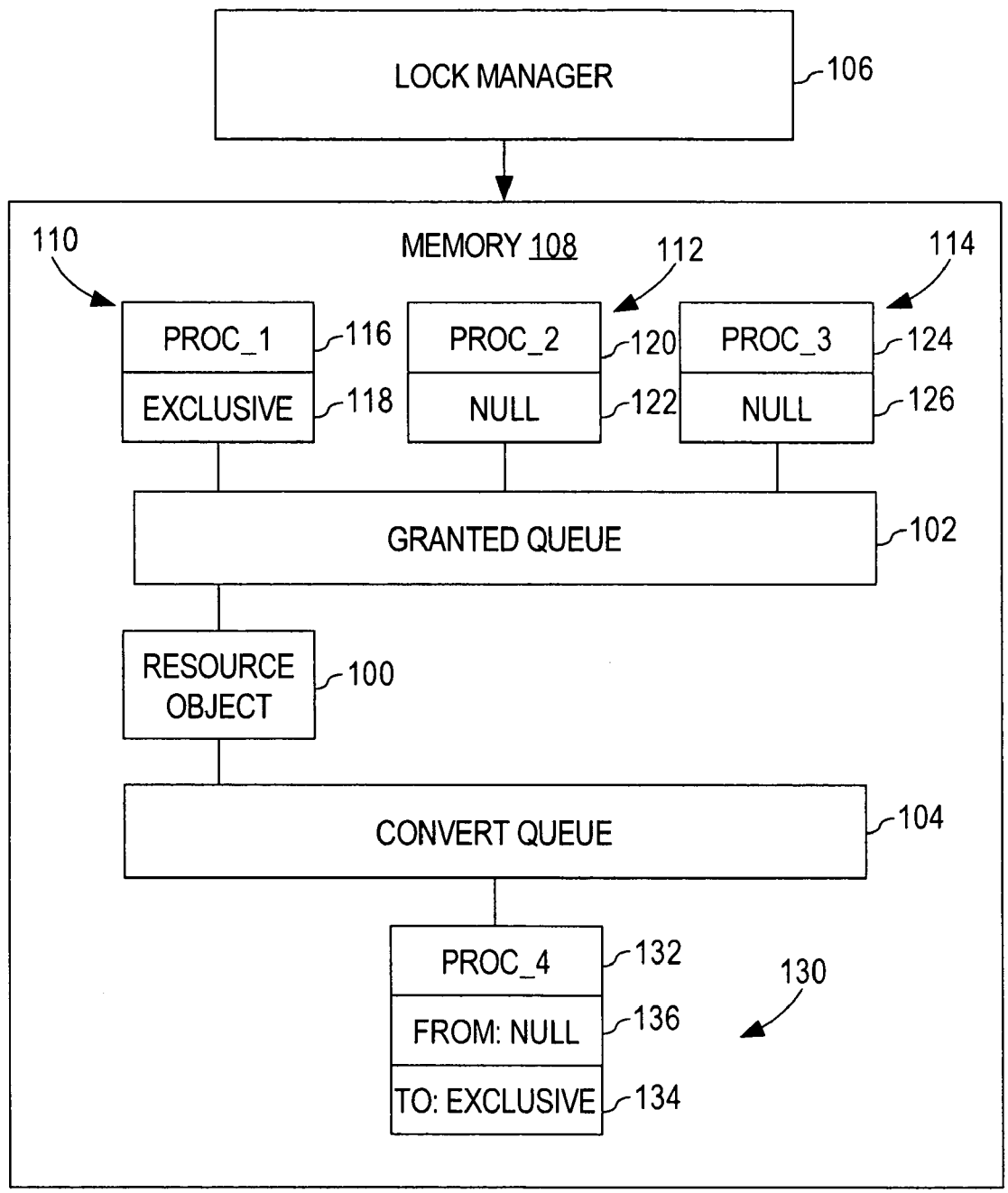
FIG. 1 is a block diagram of a lock manager and an object resource used to manage locks on a resource.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for reducing the delay between when a process requests permission to modify a resource, and when the process is allowed to begin modifying the resource. For the purpose of explanation, examples shall be given in which the resource is a disk block, where a copy of the disk block is stored in a buffer cache. However, this is merely one example of a resource to which the techniques may be applied. The present techniques are not limited to any particular type of resource.

When a process holds a share lock on a disk block, a current copy of the disk block typically already exists in the buffer cache of the node in which the process is executing. The techniques described hereafter allow processes that desire to modify a resource ("requesters") to update their private copy of the resource without waiting for the master of the resource to grant them permission to modify the resource. Consequently, the delay between the time the requester requests to update the resource and the time the resource is updated is reduced.

Shared-To-Exclusive Upgrades

For the purpose of illustration, assume that a requester holds a share lock on a resource and desires an exclusive lock on the resource. Techniques are provided that allow the share-to-exclusive requester to start modifying a private current copy of a block (which the requester already has) even before the requester has been granted the exclusive lock.

According to one embodiment, whenever there is a share-to-exclusive request for a resource, the master of the resource treats the request differently than other types of convert requests. Specifically, upon receiving such a request, the master determines whether the request can be immediately granted. If the request cannot be immediately granted, then rather than simply placing the request in the convert queue, the master determines (1) whether there are only share lock holders (no exclusive holders) on the grant queue, and (2) whether there are any pending exclusive requests on the convert queue.

If there are only share lock holders on the grant queue, and there are no pending exclusive requests on the convert queue, then the master puts the convert request at head of convert queue and sends a "proceed" message to the requester. The master also sends out downconvert request messages to all current share lock holders.

Significantly, the proceed message is sent even though one or more currently-granted locks are incompatible with the requested permission, and therefore prevent the permission from being granted at present. Thus, the proceed message indicates that the requested permission is likely to be granted, but that the requested permission is not yet granted.

When the requester receives the proceed message, the requester can start updating the block in a private memory. Changes made to the block (1) after the proceed message, and (2) before the requested permission is granted are referred to herein as "anticipatory changes". Only the process that makes an anticipatory change is allowed to access the copy of the resource that includes anticipatory change. Redo records may be generated for anticipatory changes, but neither the changed block nor the redo records can be committed ("made permanent") while the changes remain anticipatory.

When all share lock holders downconvert their locks and send acknowledge messages to the master, the master sends a lock grant message to the requester, granting the requester the exclusive lock. Once the requester has received the lock grant message, the changes cease to be "anticipatory changes" and become "permitted changes". Once a change has become permitted, the change may be committed.

Transactions

Within some systems, such as database systems, a series of operations may be performed as a single "transaction". The changes made by a transaction must be committed as an atomic unit. Therefore, as long as a transaction has any outstanding anticipatory changes, none of the changes made by the transaction may be committed.

According to one embodiment, the anticipatory changes made by a transaction are tracked. Many types of mechanisms may be used for tracking the anticipatory changes of a transaction. The present invention is not limited to any particular type of tracking mechanism. The information used to track the anticipatory changes shall be generally referred to herein as "tracking information".

When the transaction receives permission to modify a particular resource, the tracking information is updated to indicate that any anticipatory changes made by the transaction to that particular resource have been permitted. As long as the tracking information indicates that any anticipatory change made by the transaction has not been permitted, the transaction is not allowed to commit (even though all operations of the transaction may have otherwise been successfully completed).

Once all of the anticipatory changes have become permitted changes, the transaction may commit. When the transaction commits, a commit time (usually in the form of a system commit number) is assigned to the transaction. The commit time is added, as needed, to the redo records that were generated for the transaction. The redo records are then linked into a checkpoint queue to be flushed to disk to make the changes permanent. After the changes are made permanent, the changes can be accessed by other processes or instances.

Modification Requests

In the previous section, a scenario was described in which the requester was upgrading from a share lock to an exclusive lock. However, the techniques described herein are applicable in any scenario involving requests to modify resources that are managed using locks. Thus, the technique is equally applicable, for example, when the request is for an upgrade to a "concurrent write" lock or a "protected write" lock. Requests for permission to modify a resource are referred to herein as "modification requests".

Requester Operation

Figure 2:
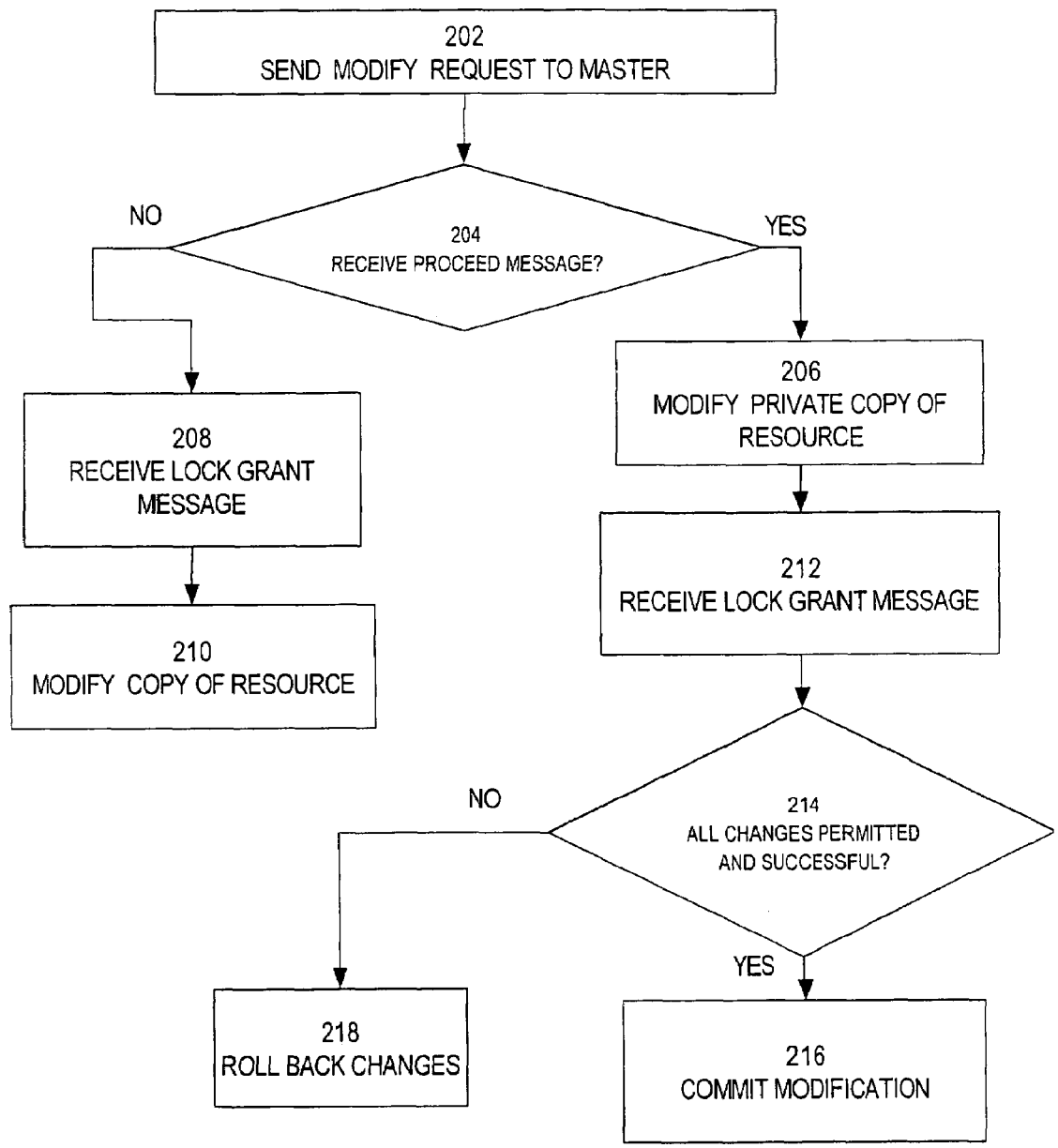
FIG. 2 is a flowchart illustrating steps performed by a process that desires to modify a resource, according to an embodiment of the invention.

FIG. 2 is a flowchart showing the steps performed by a transaction that desires to modify a resource in a system that supports anticipatory changes, according to one embodiment of the invention. Specifically, at step 202, a requester that wants to modify a resource sends a modification request to the lock manager that masters the resource. In a system that supports anticipatory changes, the requester may receive a proceed message. If a proceed message is not received, control passes from step 204 to step 208 where the requester will eventually receive a lock grant message. After the requester receives a lock grant message, the requester may modify the resource (step 210).

If the requester receives a proceed message, control passes from step 204 to step 206. At step 206, the requester makes an anticipatory change by modifying a private copy of the resource without having been granted permission to make the modification. If the requester is a transaction, then the requester also updates the tracking information to reflect the anticipatory change. Significantly, after making the anticipatory change, the requester can go on to do other work. That other work may involve making additional anticipatory changes. Consequently, the tracking information for a given transaction may indicate any number of outstanding not-yet-permitted changes.

The fact that the requestor can go on to do other work before receiving permission to make an anticipatory change can lead to significant performance benefits. The longer the lag between requesting permission and receiving permission, the greater the benefit of being able to proceed without waiting for the permission. Thus, anticipatory changes are particularly beneficial in systems that include many nodes that usually share access to the same resources. Without the ability to make anticipatory changes, a process that wants to modify the shared resource has to wait for all of the other nodes to downconvert. The greater the number of nodes, the more likely that the wait will be long.

Until an anticipatory change is permitted, the change is not "made permanent". The actual process of making a change permanent may vary from system to system. For example, in some systems, a change in made permanent by flushing to disk "redo records" that identify the change. Some systems may make a change permanent by flushing to disk the changed copy of the block. Other systems may have other mechanisms by which changes are made permanent. The techniques described herein are not tied to any particular mechanism of making a change permanent.

At step 212, the requester receives permission to modify the resource. As explained above, the receipt of the permission is asynchronous relative to any other work the requester is performing, with the only exception being that receipt of permission must occur prior to making the change permanent.

If the requester is a transaction, the requester updates the tracking information to reflect that the anticipatory change has been permitted. If there are no outstanding anticipatory changes and the requester has otherwise successfully completed (step 214), then the changes made by the requester are made permanent and visible to other processes (step 216). If the requester is a transaction, and not all operations were successful and permitted, then the transaction is rolled back (step 218).

Lock Manager Operation

Figure 3:
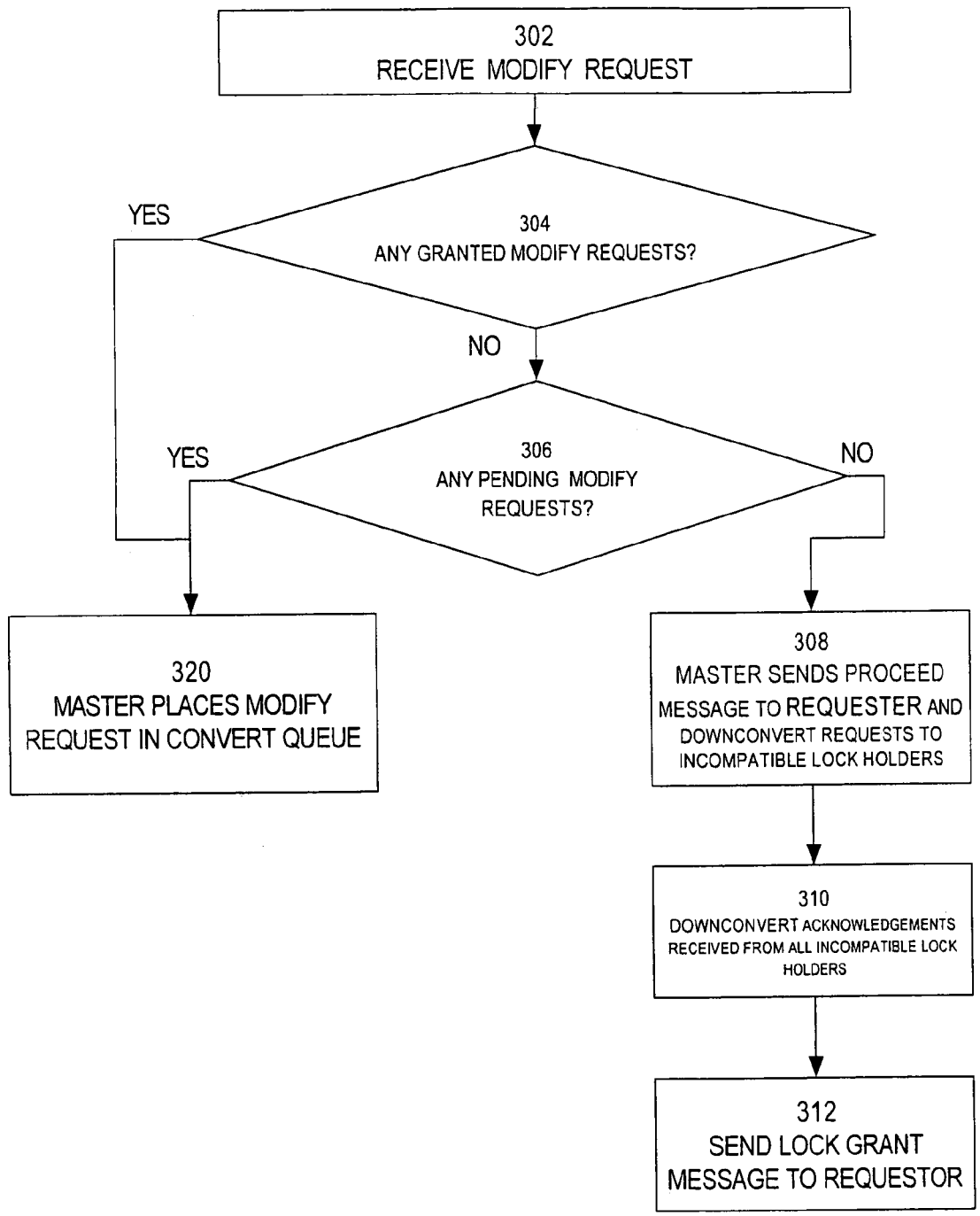
FIG. 3 is a flowchart illustrating steps performed by a lock manager, according to an embodiment of the invention.

FIG. 3 is a flowchart showing steps performed by a lock manager in system that supports anticipatory requests. At step 302, the master of a resource receives a modification request from a requester. At steps 304 and 306, the master determines whether there are any already-granted modify requests (step 304) and whether there are any pending modification requests (step 306).

In an embodiment that uses resource objects to track locks, the master may perform step 304 by inspecting the granted queue of the lock object to determine whether any of the locks on the granted queue are locks that grant modification privileges. Similarly, the master may perform step 306 by inspecting the convert queue of the lock object to determine whether any of the convert requests on the convert queue are requests for permission to modify the resource.

If any pending or granted modify requests exist, then control passes to step 320, where the modification request is placed on the convert queue. However, if no pending nor granted modify requests exist, then control passes to step 308, where the master sends a proceed message to the requester, places the modification request at the head of the convert queue, and sends downconvert requests to all of the incompatible lock holders.

When the master eventually receives downconvert acknowledgements from all incompatible lock holders at step 310, the master sends a lock grant message to the requester at step 312, and moves the modification request from the head of the request queue onto the granted queue.

Modification Requests by a Requestor that does not Currently Hold Share Lock

In the examples given above, the modification requests come from a requestor that already holds a share lock on the resource. Because the requester already holds a share lock, the requester will typically already have a copy of the current version of the resource. However, the anticipatory modification techniques described herein may also be applied in situations where the modification requests are from a requester that does not currently hold a share lock.

According to one embodiment, when the requestor does not currently hold a share lock the master causes a current copy of the block to be sent to the requester. Once the requestor receives a copy of the block, the requester can begin making anticipatory changes to the lock.

In one embodiment, if the master has a current copy of the block, then the master itself sends the current copy of the block to the requester. In this case, the master may use the same message to both send the block and communicate the "proceed" message.

If the master does not have a current copy of the block, the master may send a message to one of the share lock holders to cause the share lock holder to send a current copy of the block to the requestor. In that case, the master may separately send a "proceed message" to the requestor. Alternatively, the master may simply instruct the share lock holder to send a "proceed" message to the requester along with the current copy of the block.

In the examples given above, the granted locks that prevent the master from granting the modification request are share locks. However, it is possible that the modification request cannot be granted because there is a currently-granted exclusive lock. In the case where a currently-granted exclusive lock prevents a modification request from being granted, the requestor may start to make anticipatory changes to a "proxy" buffer. In one embodiment, the requestor uses a "past image" of the block as a proxy buffer, if a past image of the block is available. A past image of a block is a copy of the block that reflects a past state of the block. Thus, the current copy of the block may contain some changes that are not in the past image. When the current version of the resource arrives, the requestor may merge the changes in the proxy buffer into the current version of the resource.

In this scenario, the requester would typically receive the current version of the resource from the owner of the exclusive lock. Along with the current version, the owner of the exclusive lock may include a lock grant message, granting the requestor permission to make the changes to the resource. Thus, the changes are permitted at the same time that the requestor is able to merge them into the current version of the block.

According to one embodiment, redo is generated for the anticipatory changes made to the proxy buffer prior to receiving the current version of the block. Once the current version of the block arrives, the redo can be applied to the current version of the block in a manner similar to the "roll-forward" phase of recovery operations. Applying the redo to the current version of the block causes the block to reflect the changes identified in the redo.

In some situations, whether changes can be made to the block may hinge on what current values are in the block. For example, assume that a block contains data for multiple rows of a table. Assume that a uniqueness constraint has been established for one of the columns of the table. Whether a particular row can be inserted into the table (by modifying the block) may hinge on whether the insertion would violate the uniqueness constraint. Therefore, according to one embodiment, constraint checking is performed based on the current state of the block prior to merging an anticipated change into the current version of the block.

Hardware Overview

Figure 4:
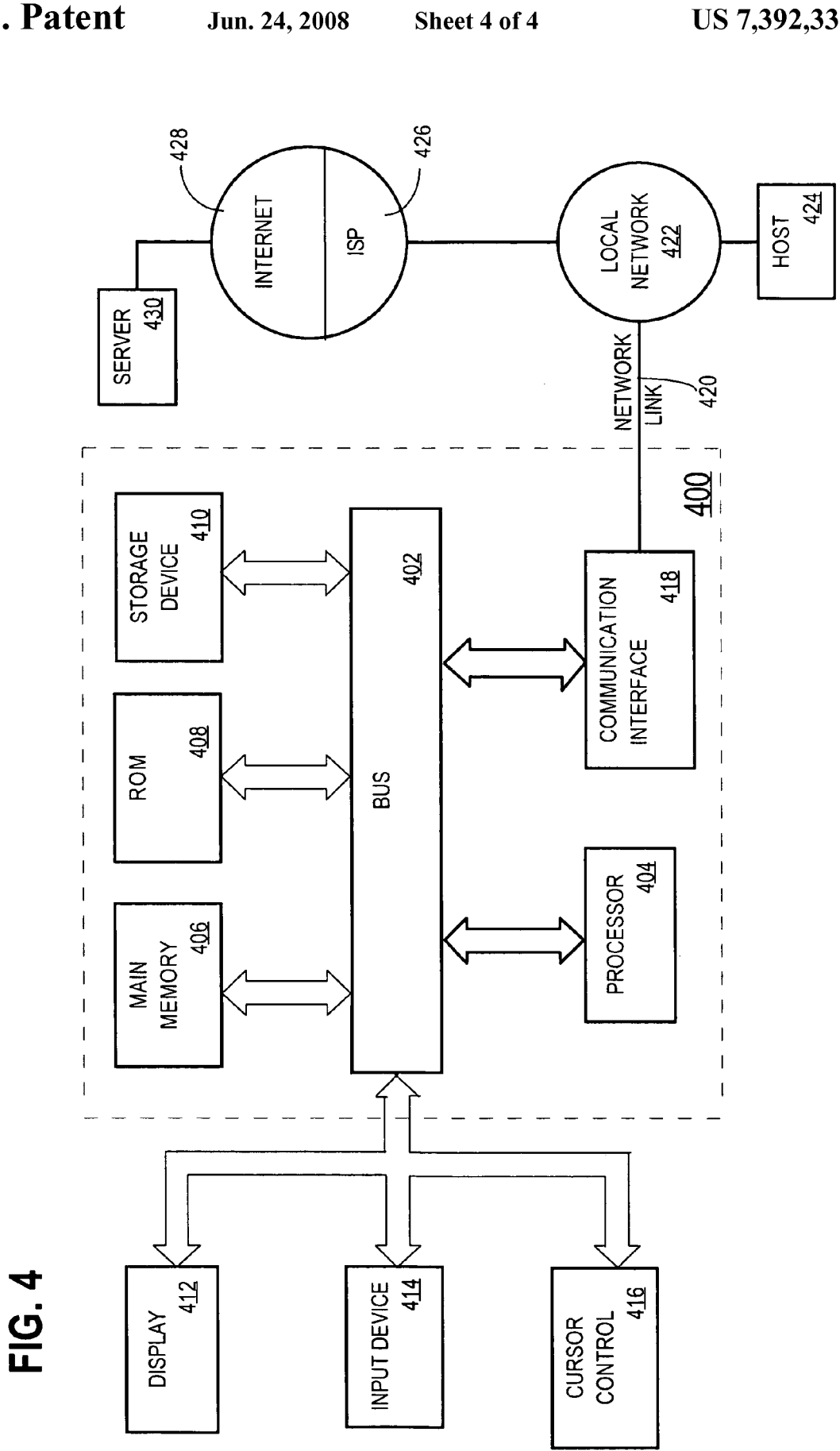
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein the machine-executed operation is at least one of:
   A) sending said instructions;
   B) receiving said instructions;
   C) storing said instructions onto a machine-readable storage medium; and
   D) executing the instructions;
   wherein said instructions are instructions which, when executed by one or more processors, cause the one or more processors to perform the steps of:
      sending to a master node a request for permission to perform a change to a particular resource;
      wherein said particular resource is a resource that contains data from a database;
      wherein said master node is a node that contains a lock manager responsible for managing a resource object that maintains information relating to lock requests on the resource;
      prior to receiving said permission, performing said change to the particular resource while preventing said change from becoming permanent within said database;
      after performing said change, receiving permission to perform said change; and
      after receiving the permission to perform said change, ceasing to prevent said change from becoming permanent to said database.

2. The method of claim 1 wherein
   the change is performed as part of a database transaction, the database transaction involves performing a plurality of database operations as an atomic unit; and
   the step of performing said change while preventing said change from becoming permanent includes:
      performing said change to a private copy of the particular resource; and
      preventing the transaction from committing.

3. The method of claim 2 wherein the instructions include instructions for:
   maintaining tracking information that indicates whether the database transaction has made any not-yet-permitted changes; and
   preventing the database transaction from committing as long as the tracking information indicates that the database transaction has made any not-yet-permitted changes.

4. The method of claim 1 wherein:
   the request for permission to perform the change is sent from a requestor to the master node; and
   the instructions include instructions for
      the master node determining (a) whether any currently-granted lock on the resource grants permission to modify the resource, and (b) whether any pending lock requests are requests for permission to modify the resource; and
      in response to determining that no currently-granted lock on the resource grants permission to modify the resource, and no pending lock request is a request for permission to modify the resource, the master node sending a proceed message to the requestor;
   the requestor performs the change in response to receiving the proceed message.

5. The method of claim 4 wherein the instructions further comprise instructions for:
   in response to determining that no currently-granted lock on the resource grants permission to modify the resource, and no pending lock request is a request for permission to modify the resource, the master node placing the request for permission to modify at the head of a queue of pending lock requests for the resource.

6. The method of claim 1 wherein:
   the request for permission to perform the change is sent from a requestor to the master node of the resource;
   at the time the requestor sends the request, the requestor holds a share lock on the resource and has a private copy of the current version of the resource; and
   the step of performing the change includes performing the change on the private copy of the current version of the resource.

7. The method of claim 1 wherein:
   the request for permission to perform the change is sent from a requestor to the master node of the resource;
   at the time the requestor sends the request, another process holds an exclusive lock on the resource; and
   the step of performing the change includes performing the change on a proxy buffer; and
   merging the change from the proxy buffer into a copy of the current version of the resource when the requestor receives the copy of the current version of the resource.

8. The method of claim 7 wherein the instructions include instructions for generating redo in response to performing the change on the proxy buffer.

9. The method of claim 7 wherein:
   the change is performed on the proxy buffer without checking for constraint violations; and
   the change is merged into the copy of the current version only after checking for constraint violations.

10. The method of claim 1 wherein:
    the request for permission to perform the change is sent from a requestor to the master node of the resource;
    at the time the requestor sends the request, the requestor does not hold a share lock on the resource, but a set of one or more other processes hold a share lock on the resource; and
    the instructions include instructions for causing a process in said set of processes to send to the requestor a current copy of the resource.

11. The method of claim 10 wherein:
    the requestor performs the changes in response to receiving a proceed message; and
    the instructions include instructions for causing said process in said set of processes to include, with the current copy of the resource, said proceed message.

12. The method of claim 10 wherein:
    the requestor performs the changes in response to receiving a proceed message; and
    the instructions include instructions for causing the master node of the resource to send the proceed message to the requestor.

13. A method comprising performing a machine-executed operation involving instructions, wherein the machine-executed operation is at least one of:
    A) sending said instructions;
    B) receiving said instructions;
    C) storing said instructions onto a machine-readable storage medium; and
    D) executing the instructions;

wherein said instructions are instructions which, when executed by one or more processors, cause the one or more processors to perform the steps of:

receiving, at a master node of a resource, a request from a requestor, wherein the request is for permission to modify the resource that contains data from a database;

wherein said master node is a node that contains a lock manager responsible for managing a resource object that maintains information relating to lock requests on the resource;

while one or more currently granted locks prevent the master node from granting the requestor permission to modify the resource, the master node causing the requestor to receive a proceed message that allows the user to make an anticipatory change to the resource but prohibits the change from being made permanent to the database;

when no currently granted locks prevent the master node from granting the requestor permission to modify the resource, the master node sending a lock grant message to the requestor that allows the requestor to make the change permanent to the database.

14. The method of claim 13 wherein the instructions further include instructions for causing the master node to place the request at the head of a request queue in front of other previously received lock requests for the resource.

15. The method of claim 13 wherein the instructions further include instructions for:

upon receiving the request, the master node determining whether any granted or requested locks are locks that grant permission to modify the resource; and the master node causing the requestor to receive a proceed message in response to determining that no granted or requested locks are locks that grant permission to modify the resource.

16. The method of claim 13 wherein:

the requestor holds a share lock on the resource; and the master node causes the requestor to receive a proceed message by sending the proceed message to the requestor.

17. The method of claim 13 wherein:

the requestor does not hold a share lock on the resource; and the master node causes the requestor to receive a proceed message by causing a process that does hold a share lock on the resource to send to the requestor (a) a current copy of the resource to the requestor, and (b) the proceed message.

* * * * *

UNITED STATES PATENT AND TRADEMARK OFFICE
CERTIFICATE OF CORRECTION

PATENT NO. : 7,392,335 B2
APPLICATION NO. : 11/351675
DATED : June 24, 2008
INVENTOR(S) : Chan et al.

It is certified that error appears in the above-identified patent and that said Letters Patent is hereby corrected as shown below:

In column 2, line 53, before "indicates" delete "10" and insert -- 110 --, therefor.

In column 2, line 55, delete "12" and insert -- 112 --, therefor.

In column 4, line 23, before "DESCRIPTION" insert -- BRIEF --.

In column 6, line 53, delete "requester" and insert -- requestor --, therefor.

In column 7, line 15, delete "requester" and insert -- requestor --, therefor.

In column 7, line 33, delete "requester." and insert -- requestor. --, therefor.

In column 7, line 49, delete "requester," and insert -- requestor, --, therefor.

In column 7, line 55, delete "requester" and insert -- requestor --, therefor.

In column 7, line 64, delete "requester" and insert -- requestor --, therefor.

In column 7, line 65, delete "requester" and insert -- requestor --, therefor.

In column 8, line 1, delete "requester" and insert -- requestor --, therefor.

In column 8, line 4, delete "lock" and insert -- lock, --, therefor.

In column 8, line 5, delete "requester." and insert -- requestor. --, therefor.

In column 8, line 6, delete "requester" and insert -- requestor --, therefor.

UNITED STATES PATENT AND TRADEMARK OFFICE
CERTIFICATE OF CORRECTION

PATENT NO.        : 7,392,335 B2
APPLICATION NO.   : 11/351675
DATED             : June 24, 2008
INVENTOR(S)       : Chan et al.

It is certified that error appears in the above-identified patent and that said Letters Patent is hereby corrected as shown below:

In column 8, line 7, delete "lock." and insert -- block. --, therefor.

In column 8, line 10, delete "requester." and insert -- requestor. --, therefor.

In column 8, line 19, delete "requester" and insert -- requestor --, therefor.

In column 8, line 36, delete "requester" and insert -- requestor --, therefor.

Signed and Sealed this

Seventh Day of July, 2009

JOHN DOLL
*Acting Director of the United States Patent and Trademark Office*